United States Patent [19]

Oyama et al.

[11] Patent Number: 4,640,867
[45] Date of Patent: Feb. 3, 1987

[54] OPTICAL ARTICLE HAVING IMPROVED HEAT RESISTANCE

[75] Inventors: Takuji Oyama; Mamoru Mizuhashi, both of Yokohama, Japan

[73] Assignee: Asahi Glass Company, Ltd., Tokyo, Japan

[21] Appl. No.: 735,137

[22] Filed: May 17, 1985

[30] Foreign Application Priority Data

May 29, 1984 [JP] Japan .................. 59-107619

[51] Int. Cl.⁴ ............ B32B 15/00; B32B 17/06; B32B 9/00; B32B 15/04
[52] U.S. Cl. ............ 428/432; 428/469; 428/472; 428/701; 428/702
[58] Field of Search .......... 428/432, 701, 702, 469, 428/472, 698–699

[56] References Cited

U.S. PATENT DOCUMENTS

| | | | |
|---|---|---|---|
| 4,497,700 | 2/1985 | Groth et al. | 428/432 X |
| 4,510,190 | 4/1985 | Gläser | 428/432 X |
| 4,529,657 | 7/1985 | Franz | 428/432 X |
| 4,556,599 | 12/1985 | Sato et al. | 428/432 X |

FOREIGN PATENT DOCUMENTS 0174805 10/1984 Japan ..................... 428/432

Primary Examiner—Nancy Swisher
Attorney, Agent, or Firm—Oblon, Fisher, Spivak, McClelland & Maier

[57] ABSTRACT

An optical article having improved heat resistance, which comprises a substrate and at least one laminated coating formed on the substrate, the laminated coating comprising a highly expansive layer having a high thermal expansion coefficient and a less expansive layer having a thermal expansion coefficient lower than that of the highly expansive layer, wherein the improvement is characterized in that a Ti coating layer or a Cr coating layer is interposed at the interface between the highly expansive layer and the less expansive layer.

12 Claims, 5 Drawing Figures

OPTICAL ARTICLE HAVING IMPROVED HEAT RESISTANCE

BACKGROUND OF THE INVENTION

1. Field of the Invention

The present invention relates to an optical article provided with an optical coating and having excellent heat resistance.

2. Description of the Prior Art

In order to impart various desired properties to an optical article, it is common to employ an optical interference coating prepared by laminating a single layer or multi-layers of dielectric material having a high, intermediate or low refractive index.

For instance, there may be mentioned an antireflection coating as an example of commonly employed optical interference coatings. As an antireflection coating, there has been known a single-layered antireflection coating prepared by forming $MgF_2$ (material having a low refractive index) on a substrate in an optical layer thickness of $\lambda/4$, or an antireflection coating having a three-layered structure prepared by forming on a substrate $Al_2O_3$ (material having an intermediate refractive index), $ZrO_2+TiO_2$ (material having a high refractive index) and $MgF_2$ in an optical layer thickness of $\lambda/4$, $\lambda/2$ and $\lambda/4$, respectively, in this order from the substrate side. Further, as an optical filter, there has been known a filter prepared by laminating $MgF_2$ and $TiO_2$ (material having a high refractive index) alternately.

These optical interference coatings have sufficient mechanical strength, i.e. adhesion and hardness, for use at a temperature around room temperature, if they were formed by vapor deposition on substrates at e.g. 300° C. However, there has been a problem such that if they are subjected, after the vapor deposition, to heat treatment e.g. at 450° C. for 2 hours in air, and then they are used at a temperature around room temperature, the mechanical strength of the above-mentioned conventional coating structure tends to deteriorate.

For instance, as shown in FIG. 1, a glass plate with an antireflection coating is prepared by forming on a float glass substrate surface 1 an $Al_2O_3$ layer 2 (thickness: 780 Å) as the first layer, a $ZrO_2+TiO_2$ layer 3 (ratio of $ZrO_2/TiO_2$: about 9, thickness: 1200 Å) as the second layer and a $MgF_2$ layer 4 (thickness: 940 Å) as the third layer in this order by a vacuum vapor deposition method. Non-treated Sample 5 thereby obtained and Sample 6 obtained by the heat treatment thereof at 450° C. for 2 hours in air, are subjected to abrasion resistance tests (eraser test and kaolin test) and scratch resistance test, as mechanical strength tests. The results are as shown in Table 1, and a distinct deterioration is observed in the heat-treated Sample 6 as compared with the non-treated Sample 5.

As a result of extensive researches on this deterioration mechanism, the present inventors have found the following facts. Namely, this deterioration is observed at the first interface from the air side, i.e. at the interface between the outermost $MgF_2$ layer 4 and the $ZrO_2+TiO_2$ layer 3 therebeneath. It is believed that such deterioration is caused by the difference in the thermal expansion coefficient between the $MgF_2$ layer and the $ZrO_2+TiO_2$ layer. In general, most of oxides have a thermal expansion coefficient not higher than $10\times10^{-6}$ $deg^{-1}$ (temperature range: room temperature to 450° C.), while fluorides such as $MgF_2$ have a thermal expansion coefficient of at least $20\times10^{-6}$ $deg^{-1}$ (temperature range: room temperature to 450° C.) This difference in the thermal expansion coefficient is believed to cause slipping of the interface at the time of the heat treatment, whereby the bondage at the interface will be broken, and the bond strength at the interface will be weakened.

In the above-mentioned multi-layer type optical interference coatings, such disadvantages may be solved by employing, instead of the highly heat-expansive material $MgF_2$, a material having a heat expansion coefficient smaller than that of $MgF_2$. However, no other materials have so far been known which have adequate mechanical strength and durability by itself and chemical stability, and yet has a low refractive index comparable to $MgF_2$. On the other hand, for the same reason, it is obliged to use an oxide material as a material having a high refractive index, whereby it is impossible to eliminate the difference in the heat expansion coefficient.

SUMMARY OF THE INVENTION

Under the circumstances, the present inventors have conducted extensive research with an aim to prevent this deterioration, and have finally found that the deterioration of the mechanical strength after the heat treatment can substantially be reduced by interposing a Ti coating layer or a Cr coating layer as a bonding layer at the interface to be weakened.

Namely, the present invention is based on the above discovery, and provides an optical article having improved heat resistance, which comprises a substrate and at least one laminated coating formed on the substrate, the laminated coating comprising a highly expansive layer having a high thermal expansion coefficient and a less expansive layer having a thermal expansion coefficient lower than that of the highly expansive layer, wherein the improvement is characterized in that a Ti coating layer or a Cr coating layer is interposed at the interface between the highly expansive layer and the less expansive layer.

DETAILED DESCRIPTION OF THE INVENTION

Figure 1:
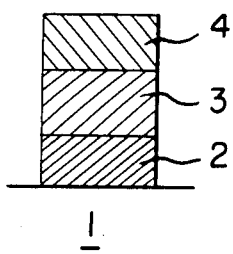
FIG. 1 is a partial cross-sectional view of a conventional optical article with an antireflection coating.

In a preferred embodiment of the present invention, the metallic Ti coating layer or Cr coating layer interposed at the interface between the highly expansive layer and the less expansive layer to improve the bondage, has a thickness of at least 10 Å.

The mechanism for the effects of the present invention is not necessarily clearly understood, but is believed to be as follows. Namely, firstly, the above-mentioned thin metal layer takes a structure of islands, as observed by an electron microscope, and the islands structure serves to increase the contacting surface at the interface, whereby the strength at the interface is believed to increase. Secondly, it may be that non-directional bondage like metal bond in the above-mentioned thin metal layer absorbs the slipping of the interface due to the difference in the thermal expansion coefficient. For such functional effects to be effective, the bonding strength at the interface formed afresh by the interposition of a metal layer, i.e. the bonding strength at the interface between e.g. the metal layer-the oxide layer, or the metal layer-the fluoride layer, must be adequately large. Accordingly, said metal layer is selected among such metal layers capable of providing an adequate bonding strength. If the bonding strength is not adequate, peeling is likely to occur at the new interfaces. The present inventors have conducted extensive experiments by using various metals for the bonding layer, and as a result, have found that the metallic Ti coating layer or Cr coating layer exhibits an improvement of the bonding strength to an adequate extent. The present invention is based on this discovery.

In order to obtain adequate functional effects as described above, the Ti coating layer or Cr coating layer in the present invention is required to have a certain layer thickness. The present inventors have conducted experiments by varying the thickness of the Ti and Cr coating layers, and have found it necessary that the thickness of these metal layers be at least 10 Å. If the thickness of these metal layers is thinner than 10 Å, the function as the bonding layer will be inadequate. On the other hand, the upper limit of the thickness of the metal layers is determined by the optical properties of the optical article of the present invention rather than by the bonding strength. Namely, these metal layers naturally have strong absorptivity, and if the thickness is excessive, the intrinsic optical properties of the optical article will be impaired. The upper limit varies depending upon the purpose and construction of the optical article to which the present invention is applied. However, it is usual that the upper limit is not more than 100 Å, preferably not more than 50 Å. Such a Ti coating layer or Cr coating layer may be a coating layer made of Ti metal or Cr metal, or may be made of a Ti alloy or a Cr alloy containing Ti or Cr in an amount of at least 50%. There is no particular restriction as to the manner for the formation of the Ti coating layer or Cr coating layer, as is evident from the above-mentioned functional effects of the present invention. Usually, it is possible to apply various coating layer-forming methods such as vacuum vapor deposition, sputtering, ion plating, chemical vapor deposition, liquid phase deposition, etc.

The bonding property is most effectively improved by the Ti coating layer or Cr coating layer of the present invention, when the difference in the thermal expansion coefficient between the highly expansive layer and the less expansive layer is at least $10 \times 10^{-6}$ deg$^{-1}$ (temperature range: room temperature to 450° C.) The upper limit of such a difference is $35 \times 10^{-6}$ deg$^{-1}$ from the viewpoint of the functional effects. For such a combination, the highly expansive layer may be, for example, a fluoride layer such as $MgF_2$, $CeF_3$, $Na_3AlF_6$ or $LaF_3$, or a mixture thereof, or a mixture comprising such a fluoride as the major component. Its thermal expansion coefficient is usually at least $20 \times 10^{-6}$ deg$^{-1}$ (temperature range: room temperature to 450° C.). On the other hand, as the low expansive layer, there may be an oxide layer such as $ZrO_2$, $TiO_2$, $Al_2O_3$, $SiO_2$, $Y_2O_3$ or $Ta_2O_5$, or a mixture thereof, or a mixture comprising such an oxide as the major component. Its thermal expansion coefficient is usually not more than $10 \times 10^{-6}$ deg$^{-1}$ (temperature range: room temperature to 450° C.). Accordingly, the present invention may be applied to antireflection coatings, interference filters, beam splitters, reflective mirrors, etc. which contain a laminated coating comprising such a high expansive layer and a less expansive layer, as the constituting coating, to improve the bonding property between the highly expansive layer and the less expansive layer. Further, there is no particular restriction as to the manner for the formation of such a highly expansive layer and a less expansive layer, and various coating layer-forming methods such as vacuum vapor deposition, sputtering, ion plating, chemical vapor phase deposition or liquid phase vapor deposition, which are commonly employed, may be used for the present invention.

Now, the present invention will be described with reference to Examples. However, it should be understood that the present invention is by no means restricted by these specific Examples.

EXAMPLE 1

(Application of a Ti coating layer to a three-layer antireflection coating for the improvement of the bonding property)

Figure 2:
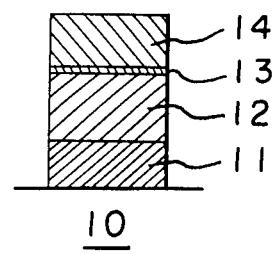
FIGS. 2 and 3 are partial cross-sectional views of optical articles with antireflection coatings according to the present invention.

As diagrammatically shown in FIG. 2, an $Al_2O_3$ layer 11 having a thickness of 780 Å as the first layer, a $ZrO_2+TiO_2$ layer 12 ($ZrO_2/TiO_2=9$, thermal expansion coefficient: about $8 \times 10^{-6}$ deg$^{-1}$) having a thickness of 1200 Å as the second layer, a Ti coating layer 13 having a thickness of about 20 Å as the third layer and a $MgF_2$ layer 14 (thermal expansion coefficient: about $25 \times 10^{-6}$ deg$^{-1}$) having a thickness of 940 Å as the fourth layer, were respectively and consecutively coated on a float glass substrate 10 by electron beam-heating vacuum deposition, to obtain an optical article wherein an adhesive Ti coating layer of the present invention is interposed in the three-layered antireflection coating. The substrate temperature at the time of the vapor deposition of each coating layer was 300° C., the pressure in the vacuum chamber was $2 \times 10^{-5}$ Torr, the deposition rate of $Al_2O_3$ was about 5 Å/sec, the deposition rate of $ZrO_2+TiO_2$ was about 9 Å/sec, the deposition rate of $MgF_2$ was about 20 Å/sec, and the deposition rate of Ti was about 0.5 Å/sec. The optical article thereby obtained was subjected to heat treatment in an electric furnace at 450° C. for 2 hours in air, to obtain Sample 1.

EXAMPLE 2

(Application of a Cr coating layer to a three-layer antireflection coating for the improvement of the bonding property)

As diagrammatically shown in FIG. 2, an $Al_2O_3$ layer 11 having a thickness of 780 Å as the first layer, a $ZrO_2+TiO_2$ layer 12 ($ZrO_2/TiO_2=9$, thermal expansion coefficient: about $8 \times 10^{-6}$ deg$^{-1}$) having a thickness of 1200 Å as the second layer, a Cr coating layer 13 having a thickness of 20 Å as the third layer and a $MgF_2$ layer 14 (thermal expansion coefficient: about $25 \times 10^{-6}$ deg$^{-1}$) having a thickness of 940 Å as the fourth layer, were respectively sequentially coated on a float glass substrate 10 by electron beam-heating vacuum vapor deposition, to obtain an optical article wherein the adhesive Cr coating layer of the present invention was interposed in the three layered antireflection coating. The substrate temperature at the time of the vapor deposition of each coating layer was 300° C., the pressure in the vacuum chamber was $2 \times 10^{-5}$ Torr, the deposition rate of $Al_2O_3$ was about 5 Å/sec, the deposition rate of $ZrO_2+TiO_2$ was about 9 Å/sec, the deposition rate of $MgF_2$ was about 20 Å/sec, and the deposition rate of Cr was about 0.5 Å/sec. The optical article thereby obtained was subjected to heat treatment in an electric furnace at 450° C. for 2 hours in air, to obtain Sample 2.

EXAMPLE 3

(Application of a Ti coating layer to a five layer antireflection coating for the improvement of the bonding property)

Figure 3:
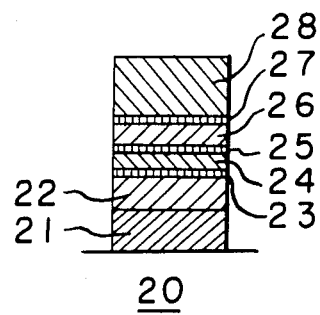

As diagrammatically shown in FIG. 3, an $Al_2O_3$ layer 21 having a thickness of 830 Å as the first layer, a $ZrO_2+TiO_2$ layer 22 ($ZrO_2/TiO_2=9$, thermal expansion coefficient: about $8 \times 10^{-6}$ deg$^{-1}$) having a thickness of 460 Å as the second layer, a Ti coating layer 23 having a thickness of about 10 Å as the third layer, a $MgF_2$ layer 24 (thermal expansion coefficient: about $25 \times 10^{-6}$ deg$^{-1}$) having a thickness of 140 Å as the fourth layer, a Ti coating layer 25 having a thickness of about 10 Å as the fifth layer, a $ZrO_2+TiO_2$ layer 26 ($ZrO_2/TiO_2=9$, thermal expansion coefficient: about $8 \times 10^{-6}$ deg$^{-1}$) having a thickness of about 470 Å as the sixth layer, a Ti coating layer 27 having a thickness of about 10 Å as the seventh layer and a $MgF_2$ layer 28 (thermal expansion coefficient: about $25 \times 10^{-6}$ deg$^{-1}$) having a thickness of 1000 Å as the eighth layer, were respectively sequentially coated on a float glass substrate 20 by electron beam-heating vacuum deposition, to obtain an optical article wherein the adhesive Ti coating layers of the present invention were interposed at the three interfaces of highly expansive layer-less expansive layer of the five layered antireflection coating. The substrate temperature at the time of the vapor deposition of each coating layer was 300° C., the pressure in the vacuum chamber was $2 \times 10^{-5}$ Torr, the deposition rate of $Al_2O_3$ was about 5 Å/sec, the deposition rate of $ZrO_2+TiO_2$ was about 9 Å/sec, the deposition rate of $MgF_2$ was about 20 Å/sec, and the deposition rate of Ti was about 0.5 Å/sec. The optical article thereby obtained was subjected to heat treatment in an electric furnace at 450° C. for 2 hours in air, to obtain Sample 3.

EXAMPLE 4

(Application of a Ti coating layer to a five layer antireflection coating for the improvement of the bonding property)

As diagrammatically shown in FIG. 3, an $Al_2O_3$ layer 21 having a thickness of 800 Å as the first layer, a $ZrO_2+TiO_2$ layer 22 ($ZrO_2/TiO_2=9$, thermal expansion coefficient: about $8 \times 10^{-6}$ deg$^{-1}$) having a thickness of 530 Å as the second layer, a Ti coating layer 23 having a thickness of about 10 Å as the third layer, a $CeF_3$ layer 24 (thermal expansion coefficient: about $30 \times 10^{-6}$ deg$^{-1}$) having a thickness of 100 Å as the fourth layer, a Ti coating layer 25 having a thickness of about 10 Å as the fifth layer, a $ZrO_2+TiO_2$ layer 26 ($ZrO_2/TiO_2=9$, thermal expansion coefficient: about $8 \times 10^{-6}$ deg$^{-1}$) having a thickness of 490 Å as the sixth layer, a Ti coating layer 27 having a thickness of 10 Å as the seventh layer and a $MgF_2$ layer 28 (thermal expansion coefficient: about $25 \times 10^{-6}$ deg$^{-1}$) having a thickness of about 960 Å as the eighth layer, were respectively sequentially coated on a float glass substrate 20 by electron beam-heating vacuum deposition, to obtain an optical article wherein the adhesive Ti coating layers of the present invention were interposed at the three interfaces of highly expansive layer-less expansive layer of the five layered antireflection coating. The substrate temperature at the time of the vapor deposition of each coating layer was 300° C., the pressure in the vacuum chamber was $2 \times 10^{-5}$ Torr, the deposition rate of $Al_2O_3$ was about 5 Å/sec, the deposition rate of $ZrO_2+TiO_2$ was about 9 Å/sec, the deposition rate of $CeF_3$ was about 4 Å/sec, the deposition rate of $MgF_2$ was about 20 Å/sec, and the deposition rate of Ti was about 0.5 Å/sec. The optical article thereby obtained was subjected to heat treatment in an electric furnace at 450° C. for 2 hours in air, to obtain Sample 4.

COMPARATIVE EXAMPLE 1

(Three layer antireflection coating)

As diagrammatically shown in FIG. 1, an $Al_2O_3$ layer 2 having a thickness of 780 Å as the first layer, a $ZrO_2+TiO_2$ layer 3 ($ZrO_2/TiO_2=9$, thermal expansion coefficient: about $8 \times 10^{-6}$ deg$^{-1}$) having a thickness of 1200 Å as the second layer, and a $MgF_2$ layer 4 (thermal expansion coefficient: about $25 \times 10^{-6}$ deg$^{-1}$) having a thickness of about 940 Å as the third layer, were respectively sequentially coated on a float glass substrate 1 by electron beam-heating vacuum deposition, to obtain an optical article with the three layered antireflection coating (Sample 5). The conditions for the vapor deposition of each layer were the same as in Example 1.

After the three-layered antireflection coating was vapor deposited on the substrate by the above-mentioned method, the optical article thereby obtained was subjected to heat treatment in an electric furnace at 450° C. for 2 hours in air, to obtain Sample 6.

COMPARATIVE EXAMPLE 2

(Five layer antireflection coating)

Figure 4:
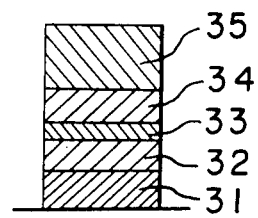
FIG. 4 is a partial cross-sectional view of another conventional optical article with an antireflection coating.

As diagrammatically shown in FIG. 4, an $Al_2O_3$ layer 31 having a thickness of 830 Å as the first layer, a $ZrO_2+TiO_2$ layer 32 ($ZrO_2/TiO_2=9$, thermal expansion coefficient: about $8 \times 10^{-6}$ deg$^{-1}$) having a thickness of 460 Å as the second layer, a $MgF_2$ layer 33 (thermal expansion coefficient: about $25 \times 10^{-6}$ deg$^{-1}$) having a thickness of about 140 Å as the third layer, a $ZrO_2+TiO_2$ layer 34 ($ZrO_2/TiO_2=9$, thermal expansion coefficient: about $8 \times 10^{-6}$ deg$^{-1}$) having a thickness of 470 Å as the fourth layer, and a $MgF_2$ layer 35 (thermal expansion coefficient: about $25 \times 10^{-6}$ deg$^{-1}$) having a thickness of about 1000 Å as the fifth layer, were respectively sequentially coated on the float glass substrate 30 by electron beam-heating vacuum deposition, to obtain an optical article provided with a five layer structured antireflection coating. The conditions for the vapor deposition of the respective layers were the same as in Example 3. The optical article thereby obtained was subjected to heat treatment in an electric furnace at 450° C. for 2 hours in air, to obtain Sample 7.

COMPARATIVE EXAMPLE 3

(Five layer antireflection coating)

As diagrammatically shown in FIG. 4, an $Al_2O_3$ layer 31 having a thickness of 800 Å as the first layer, a $ZrO_2+TiO_2$ layer 32 ($ZrO_2/TiO_2=9$, thermal expansion coefficient: about $8 \times 10^{-6}$ deg$^{-1}$) having a thickness of 530 Å as the second layer, a $CeF_3$ layer 33 (thermal expansion coefficient: about $30 \times 10^{-6}$ deg$^{-1}$) having a thickness of about 100 Å as the third layer, a $ZrO_2 + TiO_2$ layer 34 ($ZrO_2/TiO_2 = 9$, thermal expansion coefficient: about $8 \times 10^{-6}$ deg$^{-1}$) having a thickness of 490 Å as the fourth layer, and a $MgF_2$ layer 35 (thermal expansion coefficient: about $25 \times 10^{-6}$ deg$^{-1}$) having a thickness of about 960 Å as the fifth layer, were respectively sequentially formed on a float glass substrate 30 by electron beam-heating vacuum deposition, to obtain an optical article provided with a five layered antireflection coating. The conditions for the vapor deposition of the each layer were the same as in Example 4. The optical article thereby obtained was subjected to heat treatment in an electric furnace at 450° C. for 2 hours in air, to obtain Sample 8.

COMPARATIVE EXAMPLE 4

(Applicatign of a metal other than Ti or Cr)

As diagrammatically shown in FIG. 2, an $Al_2O_3$ layer 11 having a thickness of 780 Å as the first layer, a $ZrO_2 + TiO_2$ layer 12 ($ZrO_2/TiO_2 = 9$, thermal expansion coefficient: about $8 \times 10^{-6}$ deg$^{-1}$) having a thickness of 1200 Å as the second layer, a Zr coating layer 13 having a thickness of about 20 Å as the third layer, and a $MgF_2$ layer 14 (thermal expansion coefficient: about $25 \times 10^{-6}$ deg$^{-1}$) having a thickness of 940 Å as the fourth layer, were respectively sequentially coated on a float glass substrate 10 by electron beam-heating vacuum deposition, to obtain an optical article wherein a Zr coating layer was interposed at the interface of highly expansive layer-less expansive layer of the three-layered antireflection coating. The deposition rate of Zr was about 0.5 Å/sec, and other conditions for the vapor deposition were the same as in Examples 1 and 2. The optical article thereby obtained was subjected to heat treatment in an electric furnace at 450° C. for 2 hours in air, to obtain Sample 9.

Samples 1 to 9 were subjected to the eraser test and kaolin test as abrasion resistant tests. Further, they were subjected to the scratch resistance test. The results are shown in Table 1.

The eraser test was conducted in such a manner that an eraser was reciprocated for rubbing under a load of 1 kg/cm$^2$ 100 times at a rate of one reciprocation per second with a stroke of about 4 cm, whereupon the rubbed surface was visually examined and evaluated with three grades of A, B and C. A indicates that no scratch mark was observed, B indicates that certain scratch marks were observed, and C indicates that substantial scratch marks were observed. The kaolin test was conducted in such a manner that N-N kaolin clay manufactured by Tsuchiya Kaolin Kogyo K.K. was dispersed in water in a weight ratio of 1:5, and a felt was impregnated with the dispersion and then reciprocated for rubbing under a load of 1 kg/cm$^2$ 500 times at a rate of one reciprocation per second with a stroke of about 4 cm, whereupon the rubbed surface was visually examined to see if peeling was observed at the interface. The evaluation standards of A, B and C were the same as in the case of the eraser test.

The scratch test was conducted in such a manner that a Knoop indenter was permitted to run on a coated surface at a speed of 0.5 mm/sec under a load of eight different weights i.e. 1 g, 2 g, 5 g, 10 g, 20 g, 50 g, 100 g and 200 g, whereupon the surface was visually examined, and the weight (gram) of the load under which the scratch mark was first observed, was determined. In the column for the evaluation, the weight of the load under which a scratch mark was first observed, is shown.

TABLE 1

| Samples | Eraser test | Kaolin test | Scratch test |
|---|---|---|---|
| 1 (Example 1) | A | A-B | 10 g |
| 2 (Example 2) | A | A-B | 5 g |
| 3 (Example 3) | A | A-B | 5 g |
| 4 (Example 4) | A | A-B | 1 g |
| 5 (Comparative Example 1) | A | A | 20 g |
| 6 (Comparative Example 1) | B-C | B-C | 1 g |
| 7 (Comparative Example 2) | B | B | 1 g |
| 8 (Comparative Example 3) | B | B-C | 1 g |
| 9 (Comparative Example 4) | B | B | 1 g |

From the comparison of the test results of the present invention with those of Samples 5 and 6 of Comparative Examples as shown in Table 1, it is evident that the mechanical strength of the conventional three layered antireflection coatings deteriorated substantially by the heat treatment. Because of this drawback, the conventional antireflection coatings or other optical interference coatings were not suitable for use as optical articles which are required to be subjected to heat treatment at a temperature of at least 400° C. after the formation of the coating layer, or they were applicable only as articles which are not required to have high mechanical strength.

Whereas, from the comparison of the various test results on Samples 1 to 4 of the Examples of the present invention, as shown in Table 1 with those of the Comparative Examples corresponding to the respective Samples (i.e. Sample 1 and 2 with Sample 6, Sample 3 with Sample 7, and Sample 4 with Sample 8), it is evident that in each of three types of tests, the Samples of the present invention have superior results.

Further, from the comparison of the results on Samples 1 and 2 with those on Sample 9, it is evident that the effectiveness as the bonding layer is remarkable when the metal used is Ti or Cr.

Furthermore, from the comparison of the results on Samples 1 and 2 with those on Sample 5, it is evident that the mechanical strength after the heat treatment with the interposition of Ti or Cr as the bonding layer, is improved to a level almost comparable to the mechanical strength of the conventional three layer antireflection coating prior to the latter's heat treatment.

The mechanical strength of Samples 1 to 4 of these Examples, is sufficient for practical applications.

Figure 5:
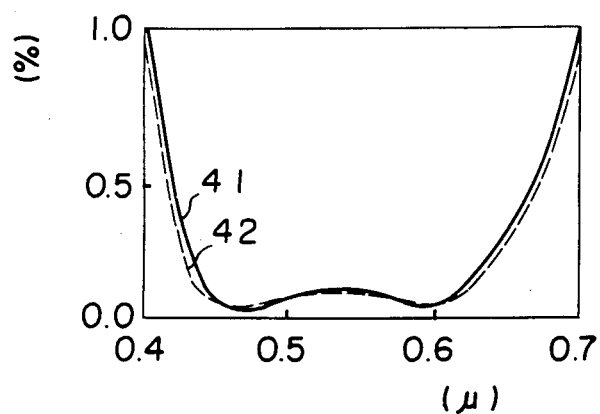
FIG. 5 shows spectral reflectance curves illustrating antireflection properties of Samples obtained in an Example of the present invention and a Comparative Example.

FIG. 5 shows spectral reflectance curves of the antireflection coatings of Samples 1 and 5. From this Figure, it is evident that the spectral reflectance 41 of Sample 1 according to the present invention has substantially the same antireflection properties as the spectral reflectance 42 of Sample 5 according to the conventional Comparative Example.

Thus, according to the present invention, it is possible to prepare a new optical article which is capable of maintaining the mechanical strength even after the heat treatment without no substantial deterioration of the optical properties.

As described in the foregoing, according to the present invention, by interposing a very thin Ti coating layer or Cr coating layer at the interface between a highly expansive layer and a less expansive layer having a substantial difference in the thermal expansion coefficients in various optical articles having a laminated coating comprising a highly expansive layer and a less expansive layer, such as antireflection coatings, interference filters, beam splitters, reflecting mirrors, etc., it is possible to improve the bonding property at the interface and improve the heat resistance without impairing the optical properties of the optical articles.

According to the present invention, a highly heat resistant optical interference thin film system can be applied to any article which is required to be subjected to heat treatment after the formation of the coating layer, which used to be difficult. Thus, the present invention provides a substantial contribution to the industry.

What is claimed is:

1. An optical article having improved heat resistance, which comprises a substrate and at least one laminated coating formed on the substrate, the laminated coating comprising (A) a highly expansive layer having a high thermal expansion coefficient and (B) a less expansive layer having a thermal expansion coefficient lower than that of the highly expansive layer, wherein the improvement is characterized in that a Ti coating layer or a Cr coating layer is interposed at the interface between the highly expansive layer and the less expansive layer, wherein the said Ti coating layer or the said Cr coating layer is (1) made of Ti metal or Cr metal, or (2) a Ti metal alloy or a Cr metal alloy containing Ti or Cr in an amount of at least 50%, respectively, and wherein the said highly expansive layer is made of a fluoride such as $MgF_2$, $CeF_3$, $Na_3AlF_6$, $LaF_3$ or a mixture thereof, and the said less expansive layer being made of an oxide such as $ZrO_2$, $TiO_2$, $Al_2O_3$, $SiO_2$, $Y_2O_3$, $Ta_2O_5$, or a mixture thereof.

2. The optical article having improved heat resistance according to claim 1, wherein the difference in the thermal expansion coefficient between the highly expansive layer and the less expansive layer is at least $10 \times 10^{-6}$ deg$^{-1}$.

3. The optical article having improved heat resistance according to claim 1, wherein the Ti coating layer or the Cr coating layer has a thickness of at least 10 Å.

4. The article of claim 1, wherein the said Ti coating layer or the said Cr coating layer has a thickness of from 10 Å to 100 Å.

5. The article of claim 1, wherein the said Ti coating layer or the said Cr coating layer has a thickness of from 10 Å to 50 Å.

6. The article of claim 1, wherein the difference in the thermal expansion coefficient between the highly expansive layer and the less expansive layer is from $10 \times 10^{-6}$ deg$^{-1}$ to $35 \times 10^{-6}$ deg$^{-1}$.

7. The article of claim 1, wherein the said highly expansive layer has a thermal expansion coefficient of at least $20 \times 10^{-6}$ deg$^{-1}$.

8. The article of claim 1, wherein the said less expansive layer has a thermal expansion coefficient of not more than $10 \times 10^{-6}$ deg$^{-1}$.

9. The article of claim 1, wherein the said less expansive layer is a $ZrO_2 + TiO_2$ layer, the said highly expansive layer is a $MgF_2$ layer, and the said coating layer is a Ti layer.

10. The article of claim 1, wherein the said less expansive layer is a $ZrO_2 + TiO_2$ layer, and the said coating layer is a Cr layer.

11. The article of claim 1, said article comprising the following configuration:
(i) a $ZrO_2 + TiO_2$ layer;
(ii) A Ti coating layer;
(iii) a $MgF_2$ layer;
(iv) a Ti coating layer;
(v) a $ZrO_2 + TiO_2$ layer;
(vi) a Ti coating layer; and
(vii) a $MgF_2$ layer.

12. The article of claim 1, said article comprising the following configuration:
(i) a $ZrO_2 + TiO_2$ layer;
(ii) a Ti coating layer;
(iii) a $CeF_3$ layer;
(iv) a Ti coating layer;
(v) a $ZrO_2 + TiO_2$ layer;
(vi) a Ti coating layer; and
(vii) a $MgF_2$ layer.

* * * * *